(12) United States Patent
Sahibzada

(10) Patent No.: US 11,842,337 B1
(45) Date of Patent: Dec. 12, 2023

(54) METHODS AND SYSTEMS FOR DATA ANALYTICS FOR PAYMENT FACILITATORS USING INTERNET-CONNECTED DEVICES

(71) Applicant: Worldpay, LLC, Symmes Township, OH (US)

(72) Inventor: Ali Sahibzada, Bellevue, WA (US)

(73) Assignee: Worldpay, LLC, Symmes Township, OH (US)

( * ) Notice: Subject to any disclaimer, the term of this patent is extended or adjusted under 35 U.S.C. 154(b) by 325 days.

(21) Appl. No.: 16/138,633

(22) Filed: Sep. 21, 2018

(51) Int. Cl.
*G06Q 20/38* (2012.01)
*G06Q 20/10* (2012.01)
*G06Q 20/32* (2012.01)
*G06Q 20/20* (2012.01)

(52) U.S. Cl.
CPC ....... *G06Q 20/3823* (2013.01); *G06Q 20/108* (2013.01); *G06Q 20/204* (2013.01); *G06Q 20/206* (2013.01); *G06Q 20/3278* (2013.01)

(58) Field of Classification Search
CPC ............ G06Q 20/3823; G06Q 20/108; G06Q 20/204; G06Q 20/206; G06Q 20/3278
See application file for complete search history.

(56) References Cited

U.S. PATENT DOCUMENTS

| | | | | |
|---|---|---|---|---|
| 8,799,122 B1* | 8/2014 | Del Favero | ............ | G06Q 40/02 705/35 |
| 9,959,265 B1* | 5/2018 | Vagell | ................... | G06F 40/177 |
| 2005/0222929 A1* | 10/2005 | Steier | ..................... | G06Q 40/00 705/35 |
| 2008/0209078 A1* | 8/2008 | Bates | ..................... | G06Q 10/00 710/10 |
| 2009/0248524 A1* | 10/2009 | Defoy | .................... | G06Q 30/02 705/14.1 |
| 2011/0066551 A1* | 3/2011 | Bruesewitz | .......... | G06Q 20/403 705/44 |
| 2015/0153908 A1* | 6/2015 | Kobayashi | ............ | H04M 1/236 715/781 |
| 2016/0132886 A1* | 5/2016 | Burke | ................ | G06Q 20/3224 705/44 |
| 2016/0337332 A1* | 11/2016 | Ghosh | .............. | G06Q 10/06393 |
| 2017/0024827 A1* | 1/2017 | McGill | .................. | G06Q 40/08 |
| 2017/0076269 A1* | 3/2017 | Saeed | .................. | G07G 1/0018 |
| 2019/0139048 A1* | 5/2019 | Senci | ................... | G06Q 20/322 |
| 2019/0180286 A1* | 6/2019 | Poole | ................... | G06Q 20/425 |

* cited by examiner

*Primary Examiner* — Chinedu C Agwumezie
(74) *Attorney, Agent, or Firm* — Bookoff McAndrews, PLLC

(57) ABSTRACT

Systems and methods for providing analytics data to payment facilitators and sub-merchants via a dynamic dashboard, in response to receiving transaction data from one or more Internet of Things (IoT) devices. In one implementation, a method includes receiving transaction data and a unique identifier of a sub-merchant, analyzing that data, and transmitting an unrequested analytics report to a dashboard.

20 Claims, 9 Drawing Sheets

METHODS AND SYSTEMS FOR DATA ANALYTICS FOR PAYMENT FACILITATORS USING INTERNET-CONNECTED DEVICES

TECHNICAL FIELD

The systems and methods described below relate generally to the field of financial transaction processing, and more particularly, to payment data processing and compiling analytics data using Internet-connected devices.

BACKGROUND

Electronic payment transactions and networks are used to conduct trillions of purchases of sales between millions of merchants and consumers around the world. A typical credit or debit transaction may involve a number of parties, including a cardholder who possesses a credit or debit card; a merchant that accepts credit or debit cards for payment; an acquirer processor that onboards and processes payments for merchants; an issuer processor that processes payment transactions for cardholders; an issuer financial institution that issues credit to cardholders; and a card association network connecting the acquire processor and issuer processor. Millions of such transactions occur daily at merchants using a variety of payment card types, such as credit cards, debit cards, prepaid cards, and so forth.

In the field of payments processing, a "payment facilitator" refers to an entity, in most cases a merchant, that may contract with an acquirer processor to provide payment processing services to the payment facilitator's own sub-merchants/clients. As defined by the card association networks or "brands," payment facilitators have primary liability for the processing accounts of these aggregated sub-merchants. Payment facilitators take on an active role in facilitating transactions by providing a white-labeled payment processing solution as a stand-alone offering, or as part of a broader service offering. Payment facilitators facilitate the movement of funds on behalf of their sponsored merchants. Specifically, the technology platform of a payment facilitator establishes a relationship with sub-merchants, each of whom collects payments; causes the payment facilitators to act as the aggregator for the payments; assumes financial liability for the sub-merchants; and controls the customer experience of sub-merchants.

In the payment facilitator arrangement, sub-merchants accept customer payments for goods and services through point-of-sale ("POS") terminals and corresponding payment processing applications. The payment data collected during a cardholder transaction at the sub-merchant POS is transmitted to a payment facilitator, and then transmitted from a payment facilitator to an acquirer processor, for processing.

Conventional methods primarily utilize this data to authorize transactions, facilitate the transfer of funds from one account to another, and detect fraud. However, existing techniques provide payment facilitators and their sub-merchants with few insights into electronic transaction data. Moreover, existing techniques provide acquirer processors with insufficient information regarding transaction processing and routing for this type of payment facilitation or sub-merchant environment.

The present disclosure is directed to overcoming one or more of the aforementioned drawbacks.

SUMMARY

According to certain aspects of the present disclosure, systems and methods are disclosed for leveraging internet of things devices to provide data analytics to payment facilitators and sub-merchants over an electronic payments network.

In one embodiment, a computer-implemented method is disclosed for using an internet of things device to provide data analytics to payment facilitators, sub-merchants and cardholders over an electronic payments network. The method includes: receiving, at a sub-merchant POS terminal, payment vehicle data from an IoT device associated with a cardholder; wherein the payment vehicle data includes transaction data and a unique identifier associated with the IoT device; transmitting, in real-time, the transaction data and the unique identifier from the sub-merchant POS to a payment facilitator computing system; transmitting, in real-time, the transaction data and unique identifier from the payment facilitator computing system to an acquirer processor computing system; cross-analyzing, by the acquirer processor computing system, the transaction data and unique identifier with transaction data and unique identifier information, previously stored in a transaction database; displaying, unrequested analytics reports on a screen associated with a payment facilitator.

In accordance with another embodiment, a system is disclosed for providing data analytics to payment facilitators, sub-merchants and cardholders over an electronic payments network. The system comprises: a memory having processor-readable instructions stored therein; and a processor configured to access the memory and execute the processor-readable instructions, which when executed by the processor configures the processor to perform a plurality of functions, including functions to: receive, at a sub-merchant POS terminal, payment vehicle data from an IoT device associated with a cardholder; wherein the payment vehicle data includes transaction data and a unique identifier associated with the IoT device; transmit, in real-time, the transaction data and the unique identifier from the sub-merchant POS to a payment facilitator computing system; transmit, in real-time, the transaction data and unique identifier from the payment facilitator computing system to an acquirer processor computing system; cross-analyze, by the acquirer processor computing system, the transaction data and unique identifier with transaction data and unique identifier information, previously stored in a transaction database; display, unrequested analytics reports on a screen associated with a payment facilitator.

In accordance with another embodiment, a non-transitory computer-readable medium is disclosed for providing data analytics to payment facilitators, sub-merchants and cardholders over an electronic payments network. A non-transitory, tangible computer readable medium having instructions stored thereon that, in response to instructions by a computer-based system, cause the computer-based system to perform operations comprising: receive, at a sub-merchant POS terminal, payment vehicle data from an IoT device associated with a cardholder; wherein the payment vehicle data includes transaction data and a unique identifier associated with the IoT device; transmit, in real-time, the transaction data and the unique identifier from the sub-merchant POS to a payment facilitator computing system; transmit, in real-time, the transaction data and unique identifier from the payment facilitator computing system to an acquirer processor computing system; cross-analyze, by the acquirer processor computing system, the transaction data and unique identifier with transaction data and unique identifier information, previously stored in a transaction database; display, unrequested analytics reports on a screen associated with a payment facilitator.

Additional objects and advantages of the disclosed embodiments will be set forth in part in the description that follows, and in part will be apparent from the description, or may be learned by practice of the disclosed embodiments. The objects and advantages of the disclosed embodiments will be realized by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

Various non-limiting embodiments of the present disclosure will now be described to provide an overall understanding of the principles of the structure, function, and use of methods and systems for providing data analytics to payment facilitators and sub-merchants over an electronic payments network.

Figure 1A:
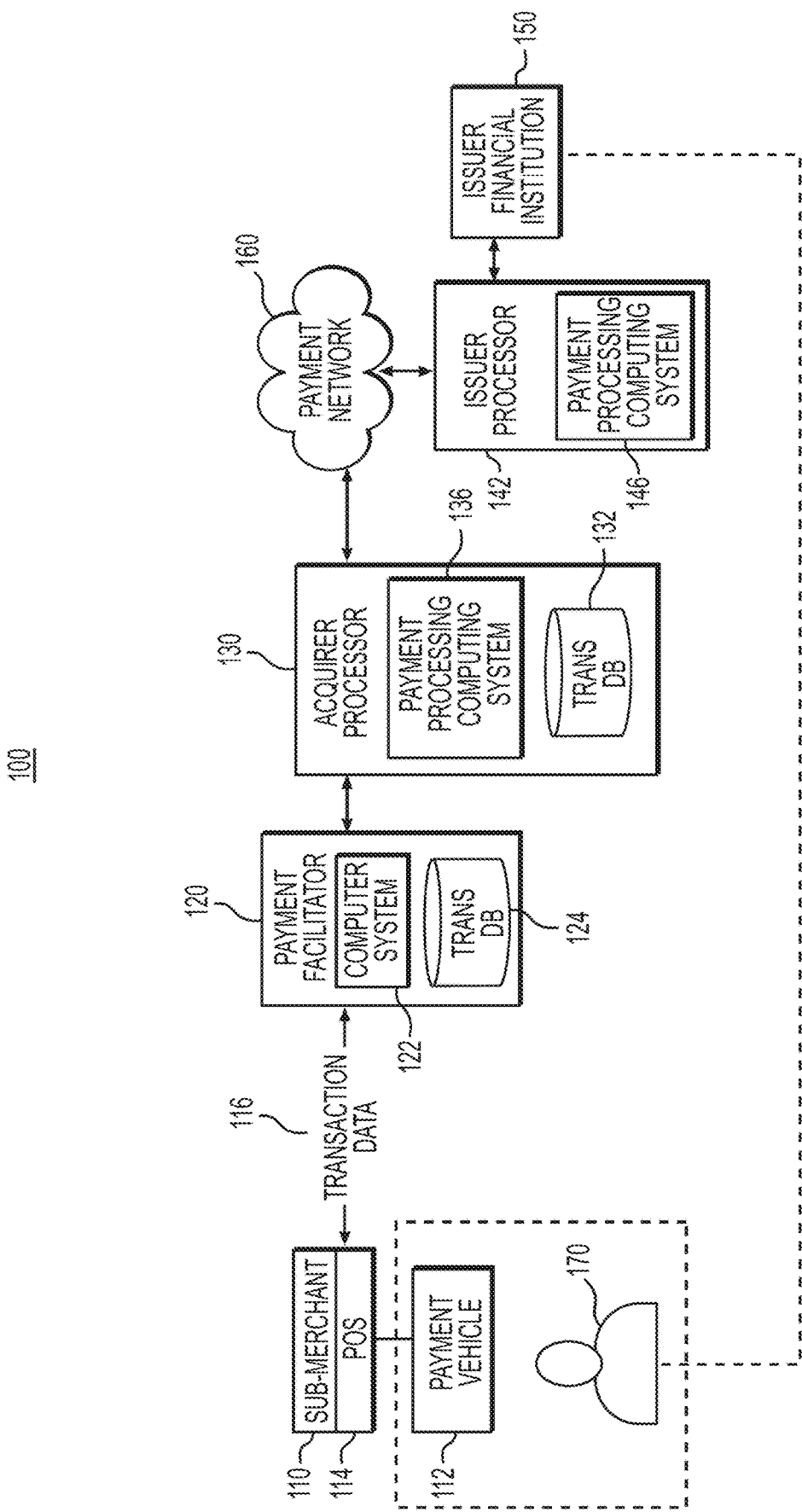
FIG. 1A depicts a block diagram of an example payment processing environment and network in which electronic transaction data is collected and transmitted between sub-merchants, a payment facilitator, an acquirer processor, and an issuer.
Figure 1B:
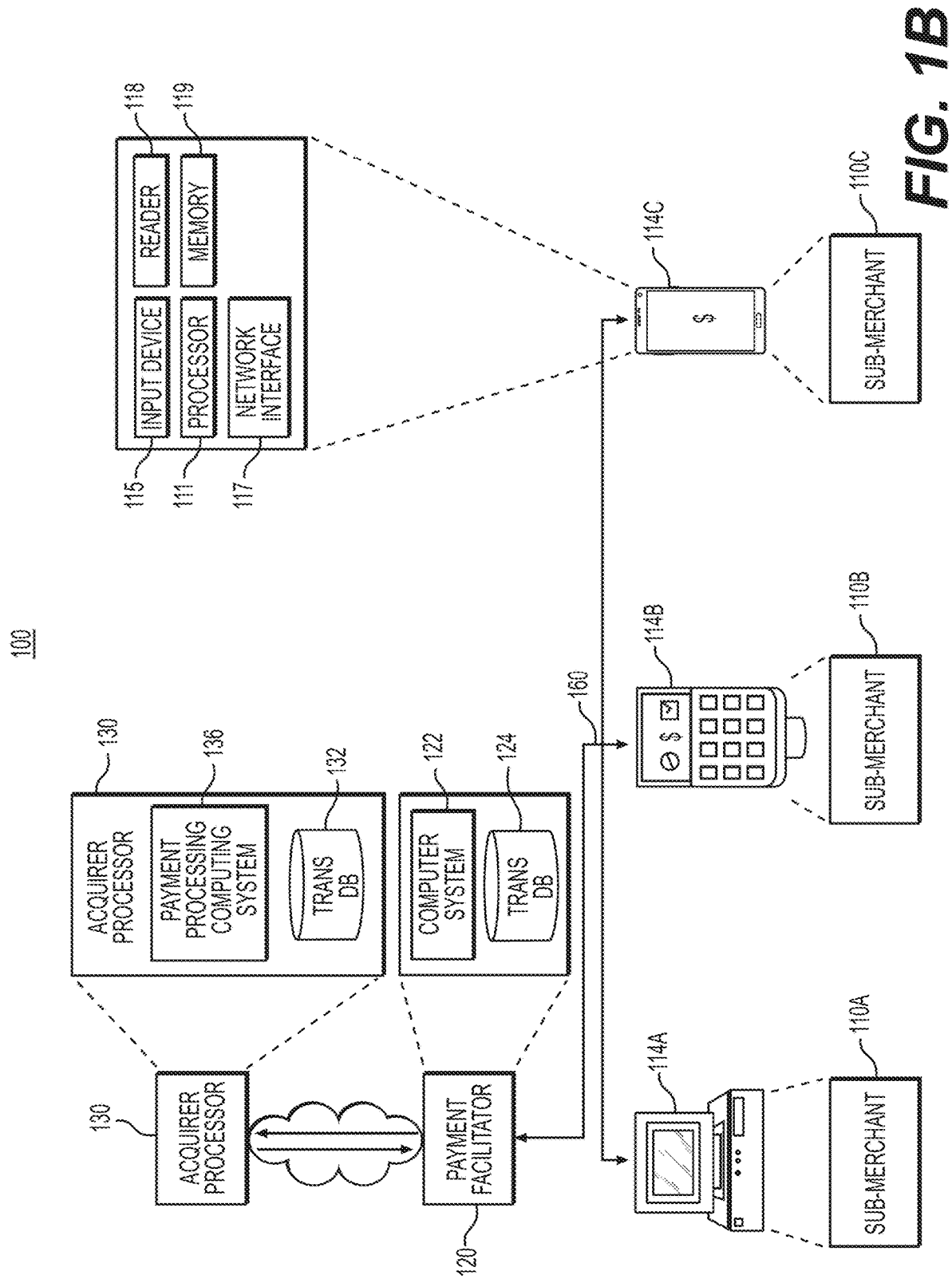
FIG. 1B depicts a block diagram of exemplary internal components of sub-merchant POS systems, payment facilitator computer systems, and acquire processor computing systems.

As described above, there is a need in the field of payments processing for systems and methods that leverage the vast amounts and various types of data that are collected during payment transactions. Transaction data can be mined to produce relevant analytics data, which an acquirer processor, payment facilitator, and/or sub-merchant can leverage in order improve their business practices and make meaningful business decisions. Moreover, as described above, in some cases, acquirer processors process transactions for payment facilitators and sub-merchants serviced by those payment facilitators. In many cases, sub-merchants and payment facilitators lack access to the detailed transaction data and analytics data that they desire to make business decisions. Additionally, as transactions are increasingly becoming more electronic, the ability to conduct transactions with internet connected devices for sub-merchant is crucial. Thus, the embodiments of the present disclosure are directed to generating custom analytics reports based on historical and real-time transaction data, wherein the transaction data originates from internet connected devices. FIGS. 1A and 1B depict block diagrams of an example payment processing environment 100 in which, electronic transaction data 116 is collected and transmitted among entities in communication with each other directly, or over electronic networks such as payment network 160 and the Internet. As shown in FIG. 1A, payment processing environment 100 may generally comprise a plurality of acquirer processors 130 in communication with a plurality of issuer processors 142 via payment network 160. Payment processing environment 100 may further generally comprise a plurality of sub-merchants 110 provided in communication with one or more acquirer processors 130 via one or more payment facilitators 120.

In this embodiment, a cardholder 170 presents a payment vehicle 112 to a sub-merchant 110 for payment of a good or service at a point of sale ("POS") terminal 114 (e.g. a mobile POS terminal or a web interface) operated by the sub-merchant 110. In this exemplary payment processing environment 100, the payment vehicle 112 (e.g., a credit card) may be issued to the cardholder 170 by an issuer financial institution 150. An issuer financial institution 150 may be any of a variety of financial institutions that is capable of issuing a payment vehicle to an account holder. Further, a sub-merchant 110 may be any type of merchant or service provider, such as, for example, a brick-and-mortar merchant, an online merchant, a mobile merchant, a kiosk, or any other type of merchant or device configured to receive payment cards, or electronic or mobile wallets, from cardholders 170 of cardholder devices (not shown) as a form of payment. As noted above, a sub-merchant 110 may contract with a payment facilitator 120 to provide payment processing services to the sub-merchant cardholders (i.e., customers or consumers) 170.

For simplicity, the description that follows will be provided by reference to a "payment vehicle," which generally refers to any type of financial alternative to currency. As is to be clear to those skilled in the art, no aspect of the present disclosure is limited to a specific type of payment vehicle. Therefore, it is intended that the following description encompasses the use of the present disclosed techniques with many other forms of financial alternatives to currency, including credit cards, debit cards, smart cards, single-use cards, pre-paid cards, electronic currency (such as might be provided through a cellular telephone or personal digital assistant), cryptocurrency, QR codes or barcodes encoded with payment data, and the like. Payment vehicles may be traditional plastic transaction cards, titanium-containing, or other metal-containing, transaction cards, clear and/or translucent transaction cards, printed on textile, foldable or otherwise unconventionally-sized transaction cards, radio-frequency enabled transaction cards, or other types of transaction cards, such as credit, charge, debit, pre-paid or stored-value cards, digital card (that can be stored on a mobile wallet or stored on an electronic device) or any other like financial transaction instrument. A payment vehicle may also have electronic functionality provided by a network of electronic circuitry that is printed or otherwise incorporated onto or within the payment vehicle (and typically referred to as a "smart card"), or be a fob having a transponder and an RFID reader, or may operate as a mobile wallet or by near field communication (NFC).

As shown in FIG. 1A and also FIG. 1B, each acquirer processor 130 may operate a payment processing computing system 136 and transactions database 132. Each payment facilitator 120 may operate a computer system 122 and transactions database 124. The POS device 114 in FIG. 1A can be a computer 114A, mobile POS device 114B and/or a mobile phone 114C, as shown in FIG. 1B. Each payment facilitator 120 may be configured to interact with the one or more POS devices 114A, 114B, 114C of sub-merchants 110A, 110B, 110C (FIG. 1B). As shown in the depicted callout of POS device 114C (FIG. 1B), in one or more embodiments, each sub-merchant POS device may comprise an input and output device 115, a memory 119 coupled to processor 111, which may control the operations of a reader 118, and a network interface 117. Memory 119 may store instructions for processor 111 and/or data, such as, for example, an identifier that is associated with a sub-merchant 110 account.

As shown in FIG. 1B, each POS device 114A-C may be configured to interact with payment vehicle 112 to obtain account information about a consumer account affiliated with a cardholder 170. In one or more embodiments, each POS 114 may include a reader 118, which may by a magnetic strip reader. In one or more embodiments, each POS device 114 may include a contactless reader 118, such as, for example, a radio frequency identification (RFID) reader, a near field communications (NFC) device configured to read data via magnetic field coupling (in accordance with ISO standard 14443/NFC), a Bluetooth transceiver, a Wi-Fi transceiver, an infrared transceiver, a laser scanner, and so forth.

In one or more embodiments, input/output device 115 may include key buttons that may be used to enter the account information directly into the POS device 114 without the physical presence of payment vehicle 112. Input/output device 115 may be configured to provide further information to initiate a transaction, such as, for example, a personal identification number (PIN), password, zip code, etc., or in combination with the account information obtained from payment vehicle 112. In one or more embodiments, the POS device 114 may include a display, a speaker, and/or a printer to present information, such as, for example, the result of an authorization request, a receipt for the transaction, an advertisement, and so forth. In one or more embodiments, network interface 117 may be configured to communicate with acquirer processor 130 over payment network 160, for example, via a telephone connection, an internet connection, or a dedicated data communication channel.

During a purchase event (i.e., a transaction), a POS device 114 may send an authorization request as part of the transaction data 116 for the purchase event to a payment facilitator 120, which then sends the transaction data to an acquirer processor 130, that processes payment vehicle transactions for sub-merchant 110. Additional intermediary entities, such as one or more payment gateways, may assist with the handling and routing of an authorization request or other related messaging. For the purposes of illustration, such intermediary entities may be considered part of an acquirer processor 130. Transaction data 116 may include identifying information from payment vehicle 112, such as a BIN number, an expiration date, various personally identifiable information (e.g., a first and last name of the cardholder), geographical data (regarding location data for sub-merchants, payment facilitators and cardholders), product data, service data, payment facilitator identifying information, and sub-merchant 110 information, for example. Transaction data 116 may further include identifying information from the purchase, such as an amount (i.e., cost of goods/service, taxes charged, conversion rates, etc.) and identifying information from sub-merchant POS device 114 and/or sub-merchant 110, for example.

In one or more embodiments, transaction data 116 may be analyzed and used to generate analytics and predictive data, which can be transmitted to and/or displayed to an individual via a graphical user interface ("GUI"), for example a dashboard 600, on a display, as will be discussed with respect to FIG. 6 below. Thus, cardholders 170 who transact with sub-merchants 110 may leverage the dashboard 600 to gain insight regarding their spending patterns with sub-merchants 110, to pay bills, to view upcoming expenses, view account balances, view profiles of individuals that the cardholders 170 would like to send or receive money from, etc. Sub-merchants 110 and payment facilitators 120 can utilize the dashboard 600 as an analytics tool to research and analyze cardholder spending patterns, view financial data pertaining to revenue and profit data, income, historical information, documents related to partnering with the payment facilitator (e.g., insurance, licensing and contractual documents), view and edit product inventory, view and edit service offerings, run reports, gather demographic information pertaining to employees, cardholders or geographical locations, edit subscription plans, send and receive messages, receive acquirer processor 130 generated notifications (e.g., recommendations) and predictive analytics data.

As noted above, each sub-merchant 110 may be considered a customer, subsidiary, or contractor of its respective payment facilitator 120 (e.g., a franchisee, a ridesharing partner, stall, booth, subsidiary, etc.). In this model, the dashboard 600 the sub-merchant 110 views, may mirror the branding, look, and feel of the dashboard 600 that would otherwise be displayed to the respective payment facilitator 120, such that the sub-merchant is not aware that the acquirer processor 130 is actually providing the dashboard 600 the sub-merchant 110 is utilizing to generate reports. One having ordinary skill in the art will understand that the dashboard 600 can be made available via any appropriate means, such as, a website (comprising HTML code) and/or an application. The transaction data aggregated by the acquirer processor 130 may be manipulated by various modules executing on a payment processing computing system 136 of the acquirer processor 130.

Figure 1C:
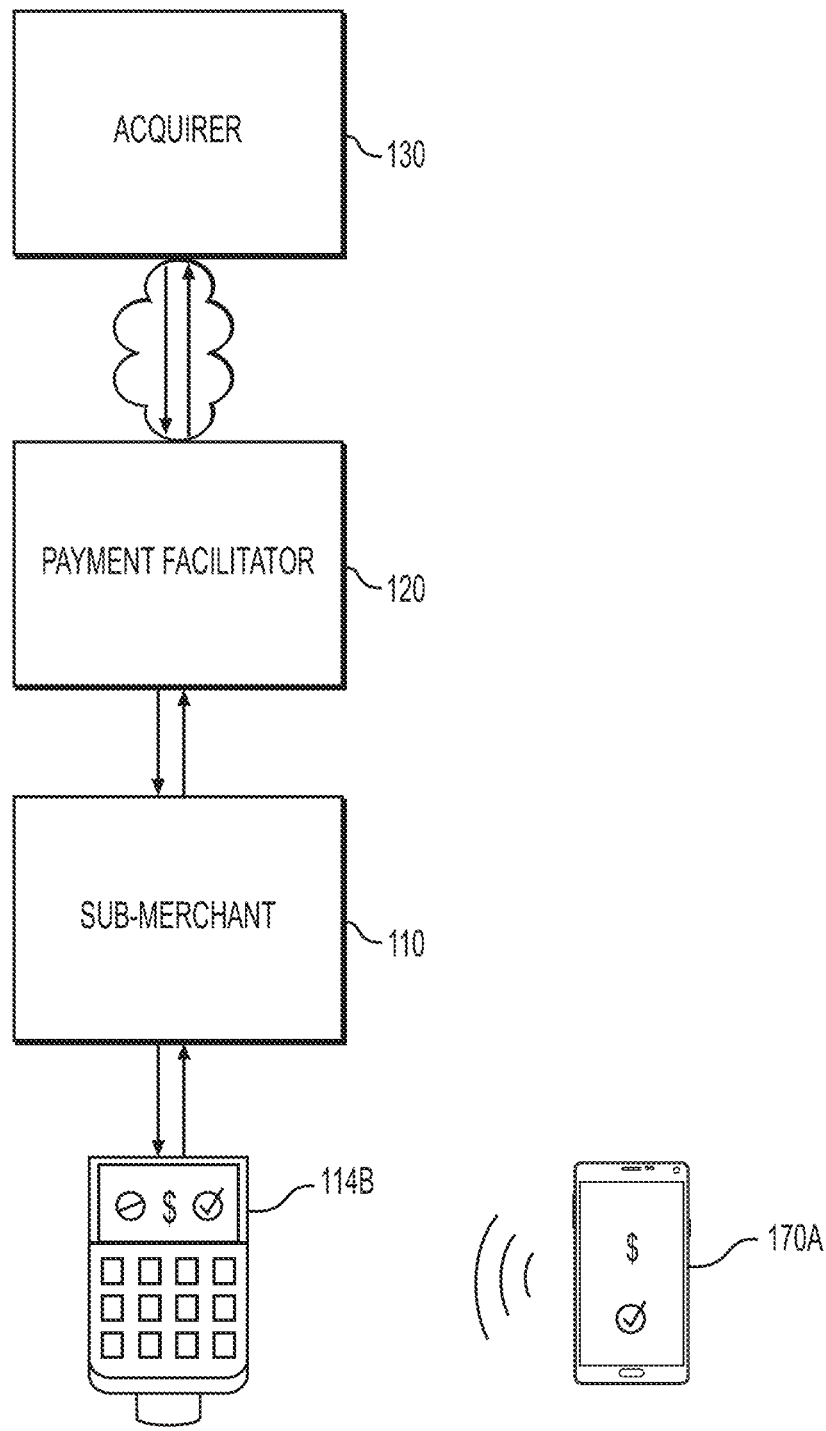
FIG. 1C depicts a block diagram of an example mobile IoT device interacting with a POS terminal to facilitate a transaction.

Referring to FIG. 1C, a POS terminal may be a mobile POS terminal 114B and may be configured to communicate with one or more systems of the payment processing environment 100 and a cardholder IoT device 170A, wirelessly. The mobile POS terminal 114B may communicate with the payment processing environment 100 via the internet 160, LAN, WAN, etc. The mobile POS terminal 114B may communicate with the cardholder IoT device 170A via the internet, LAN, WAN, Bluetooth, NFC, infrared, Radio signals, sending audio signals, display and capturing images via cameras, etc. For example, a cardholder 170 may initiate a transaction for a good or service by bringing an IoT device 170A in close proximity to the mobile POS terminal 114B and presenting a QR code (or any image that conveys payment vehicle data) on a display screen of the IoT device 170A. The QR code may be captured by the mobile POS terminal 114B reader or camera. In another embodiment, a cardholder's IoT device 170A may initiate a transaction by generating an audio signal through the speakers of the IoT device 170A that can be sensed via a microphone on the mobile POS terminal 114B. The mobile POS terminal 114B can also be an IoT device. Although, not an exhaustive list, an IoT device may be: a home personal assistant device, smart home device (e.g. a television, cable box, home monitoring system, electronic doorbell, a clothes washer/dryer, a refrigerator, a faucet, 1-touch device, or stove), mobile phone, tablet, phablet, laptop, PC, desktop, virtual terminal, video game system, virtual reality system augmented reality system, a smart writing utensil (e.g. smart pen), textiles, scanner readable license plate, electronic toll collection system, etc.

Figure 1D:
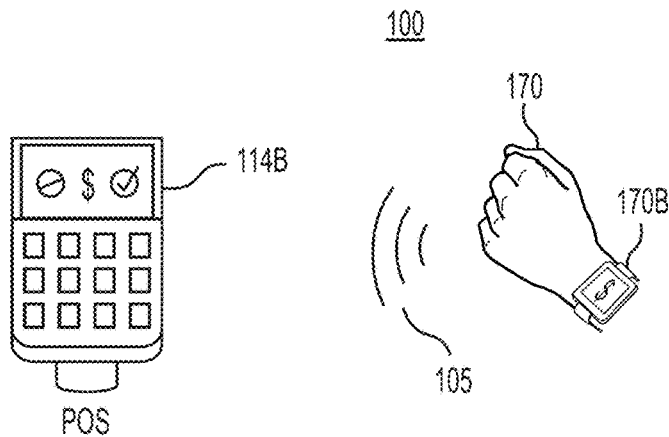
FIG. 1D depicts a block diagram of an example wearable IoT device interacting with a POS terminal to facilitate a transaction.

Referring to FIG. 1D, an IoT device may be a wearable device 170B, such as, but not limited to, a watch, removable tattoo, glasses, clothing, content lens, earbud, head phone, speech assistant device, jewelry (e.g. necklace, bracelet, ring, earring etc.), or any other wearable device. The wearable device 104 may be configured to communicate with a POS terminal 114B wirelessly via the internet, LAN, WAN, Bluetooth, NFC, infrared, Radio signals, sending audio signals, display and capturing images via cameras, etc.

Figure 1E:
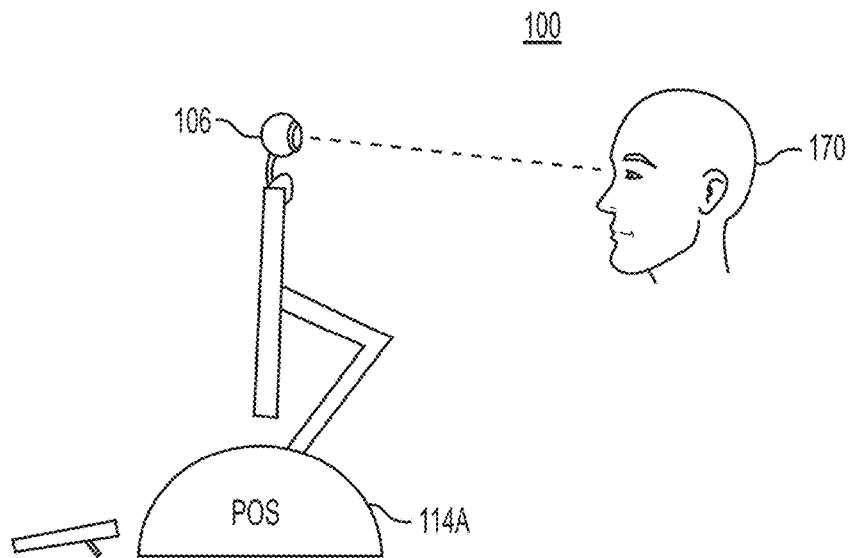
FIG. 1E depicts a block diagram of an example IoT POS terminal interacting with a cardholder by detecting biometric data to facilitate a transaction.

Referring to FIG. 1E, a POS terminal 114A may be mobile or wired POS terminal provided in communication with a network. Additionally, the POS terminal 114A may use sensors and/or interfaces to perceive sound, images, touch and biometrics. In one embodiment, a cardholder 170 may be able to initiate a transaction by allowing the POS terminal 114A to perform a retinal scan of his/her eye. Here, the eye of cardholder 170 may act as a payment vehicle to complete a transaction. The POS terminal can send the retinal scan data (i.e., transaction data 116) to the payment processing environment 100 in real-time, so that the retinal scan data may be analyzed with previously received transaction data 116, wherein the payment processing environment 100 may associate the transaction data 116 with an account (e.g., financial account, social media account, health account, employer account, merchant account) associated with a cardholder 170. Additionally, the POS terminal 114A may be a virtual terminal. Moreover, in another example, the POS terminal 114A may be able to: read the palm or fingerprint of a cardholder, scan a contact lens of a cardholder, perform facial recognition scan of a cardholder, take audio commands, etc.

Figure 1F:
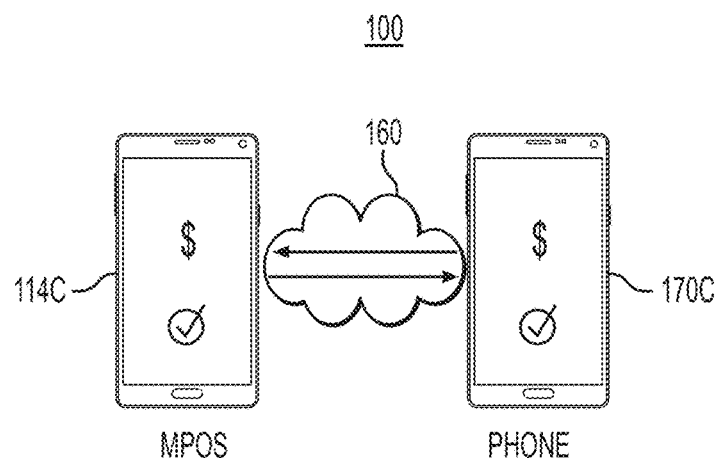
FIG. 1F depicts a block diagram of an example IoT POS terminal interacting with an IoT device.

Referring to FIG. 1F, the POS terminal 114C may be a mobile phone, tablet, laptop, PDA, a wearable device, etc. wherein a transaction is initiated and transaction data 116 is captured using a mobile application, a web browser, or virtual terminal software. In this instance the POS terminal 114C may be configured to capture payment vehicle data via a removable card reader, removable camera, removable speaker, transmission of messages between devices (e.g., signals, SMS messages), etc. For example, a sub-merchant 110 may sell a good or service via a POS terminal 114C, to a cardholder 170 by capturing an image presented on the screen of the cardholder's IoT device 170C. The image may be encoded with data associated with: a debit/credit card, a financial account, a merchant account or an address associated with a cryptocurrency wallet. The POS terminal 114C may be configured to capture this transaction data 116 and transmit captured transaction data 116 to the payment processing network 100.

Figure 2:
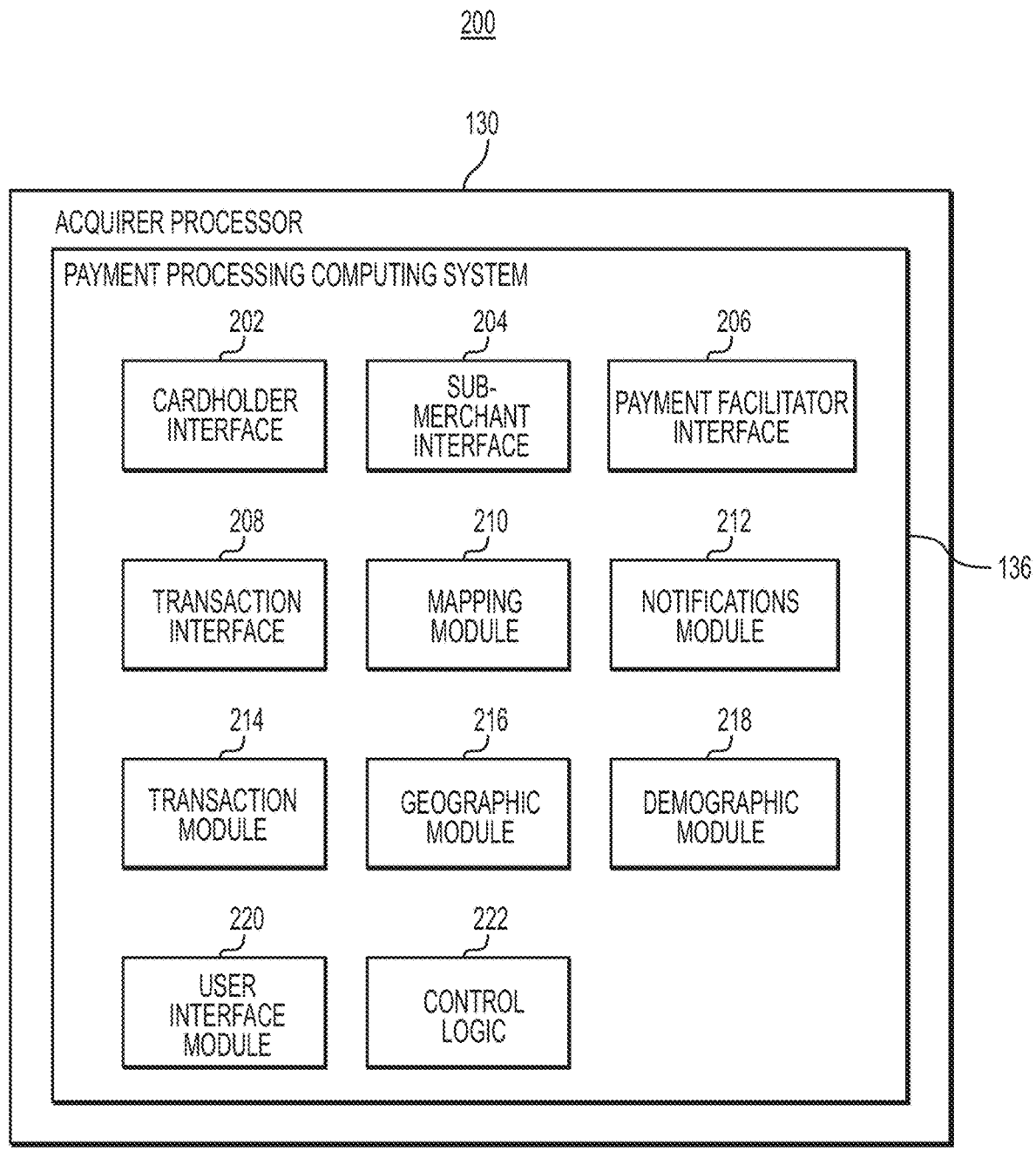
FIG. 2 depicts a block diagram of various exemplary acquirer processor interface and metrics computing modules within a computing device of an acquirer processor.

FIG. 2 depicts the various modules and control logic of acquirer processor 130 that may be configured to manipulate and analyze transaction data, generate dashboards 600, and otherwise implement the methods disclosed herein. Specifically, as shown in FIG. 2, acquire processor 130 may comprise a payment processing computing system 136 comprising a cardholder interface module 202, sub-merchant interface module 204, payment facilitator interface module 206, transaction interface module 208, mapping module 210, notifications module 212, transactions metrics module 214, geographic metrics module 216, demographics metrics module 218, user interface module 220, and control logic module 222. In one embodiment, cardholder interface module 202, sub-merchant interface module 204, and payment facilitator interface module 206 may be configured to generate reports, dashboards, or other electronic displays of transaction analytics data, customized for presentation to cardholders, sub-merchants, and payment facilitators, respectively. Transaction metrics module 214 may be configured to aggregate and store transactions data transmitted between entities of payment processing environment 100.

Figure 3:
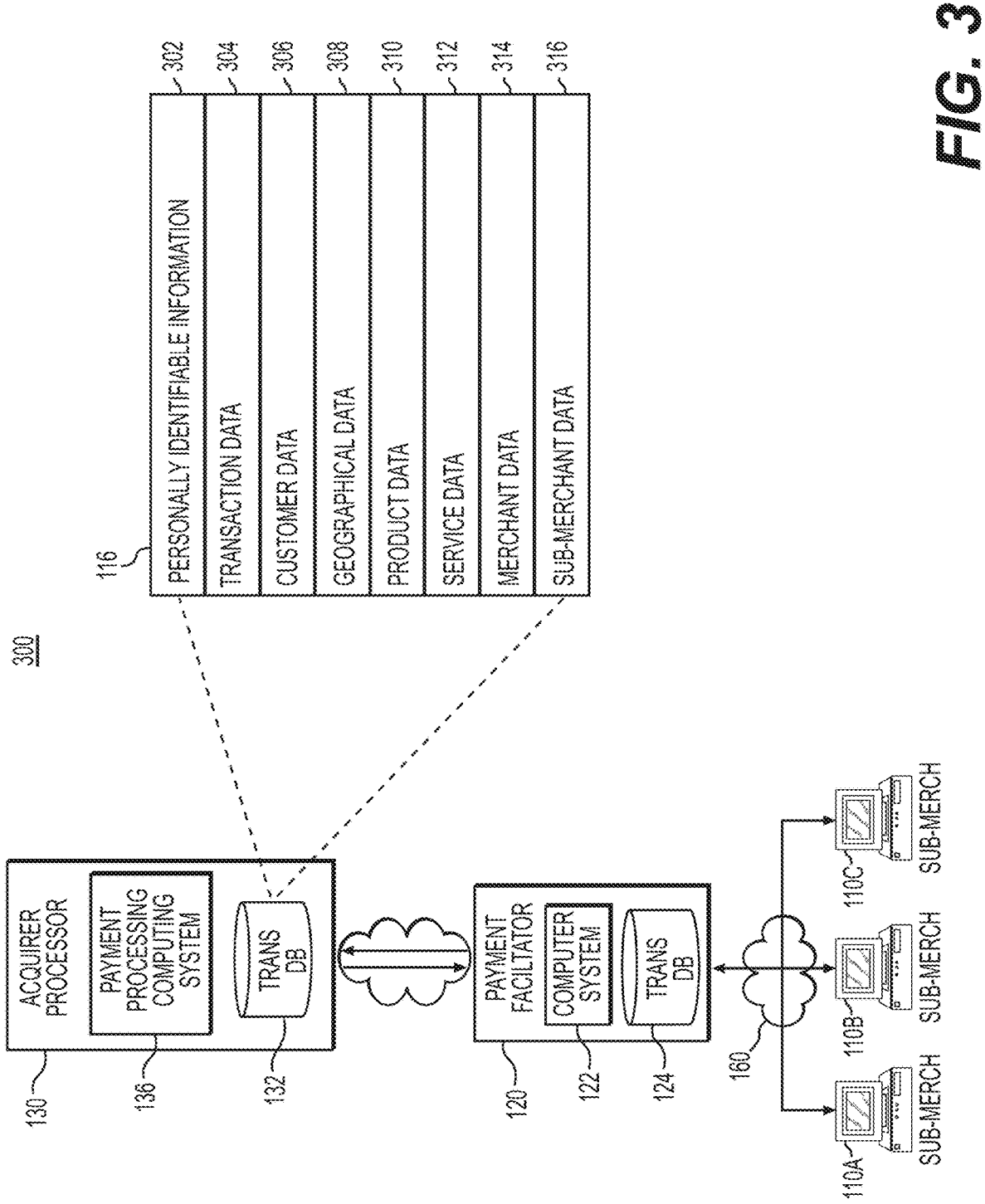
FIG. 3 depicts a block diagram of an example acquirer processor and exemplary different types of transaction data collected and stored on an acquirer processor computing system.

FIG. 3 illustrates a data table stored in the memory of the transaction database 132 of each acquirer processor 130. As shown in FIG. 3, transaction database 132 of each acquirer processor 130 may store transaction data 116 including, for example, personally identifiable information 302, transaction data 304, customer data 306, geographical data 308, product data 310, service data 312, merchant data 314, and/or sub-merchant data 316. The transaction data 116 depicted here is meant to be representative and a non-exhaustive list of the various types of data that can be collected during a transaction and stored.

Figure 4:
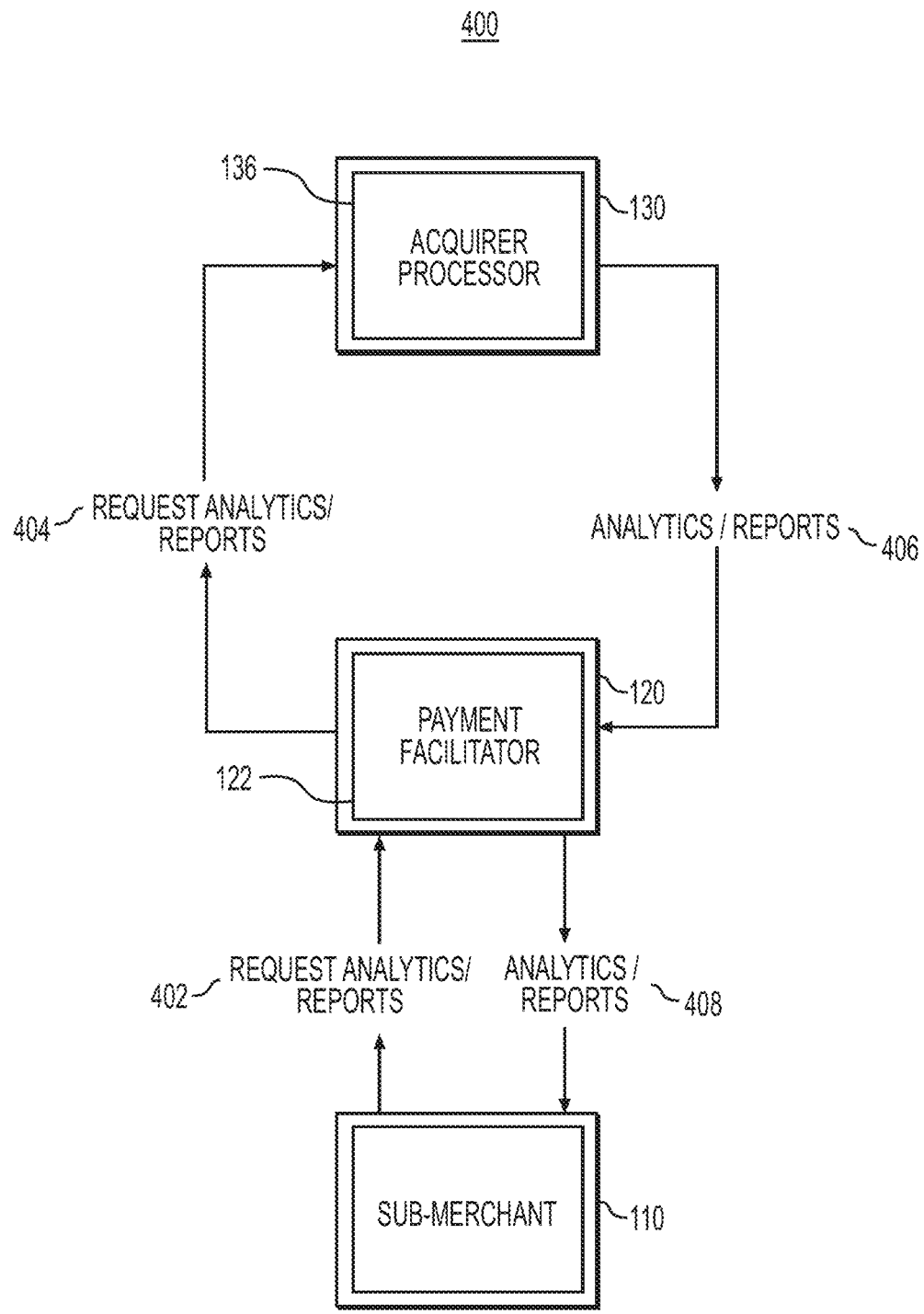
FIG. 4 depicts a flow diagram of an exemplary method of enabling the transmission of requests for analytical data and requested analytical data/reports between sub-merchants, payment facilitators, and an acquirer processor.

FIG. 4 depicts an exemplary data flow of requests for analytics/reports and responsive analytics/reports between a sub-merchant 110, payment facilitator 120, and/or acquirer 130. It should be appreciated that analytics/reports may be requested by, and provided to, any one or more of sub-merchants 110, payment facilitators 120, or even an acquirer processor 130 itself, or their agents and affiliates, among other third parties. As shown in FIG. 4, a sub-merchant 110 may request analytics/reports from a payment facilitator 120 (Step 402). Payment facilitator 122 may request the requested analytics/reports from acquirer processor 130 (Step 404). In one embodiment, the request from sub-merchant 110 may pass either directly to acquirer processor 130 or automatically through payment facilitator 120. Acquire processor 130 may generate the requested analytics/reports and send the requested analytics/reports to payment facilitator 120 (Step 406) (e.g., via payment network 160 or the Internet). Payment facilitator 120 may send the generated analytics/reports to sub-merchant 110 (Step 408). In one embodiment, the generated analytics/reports may pass either directly to sub-merchant 110 or automatically through payment facilitator 120.

For example, in the illustrative case in which a sub-merchant 110 is, for example, a rideshare driver, that rideshare driver may request analytics data 402 pertaining to the best times-of-day to drive in Chicago on a Friday with a goal of earning at least $100 per day. The rideshare driver via a dashboard, mobile app, or other electronic user interface, may submit a request to a payment facilitator 120, for example a ridesharing platform, for the analytics data (Step 402). The ridesharing platform will then (either manually or automatically) in real-time submit the rideshare driver's request for analytics data to the acquirer processor 130 (Step 404). The acquirer processor's payment processing computing system 136 will receive said request, query its transaction database 132, and transmit an analytics report to the payment facilitator payment computing system 122 (Step 406), wherein the payment facilitator computing system 122 will transmit said analytics reports in real-time to the rideshare driver's POS 114 (Step 408).

Figure 5:
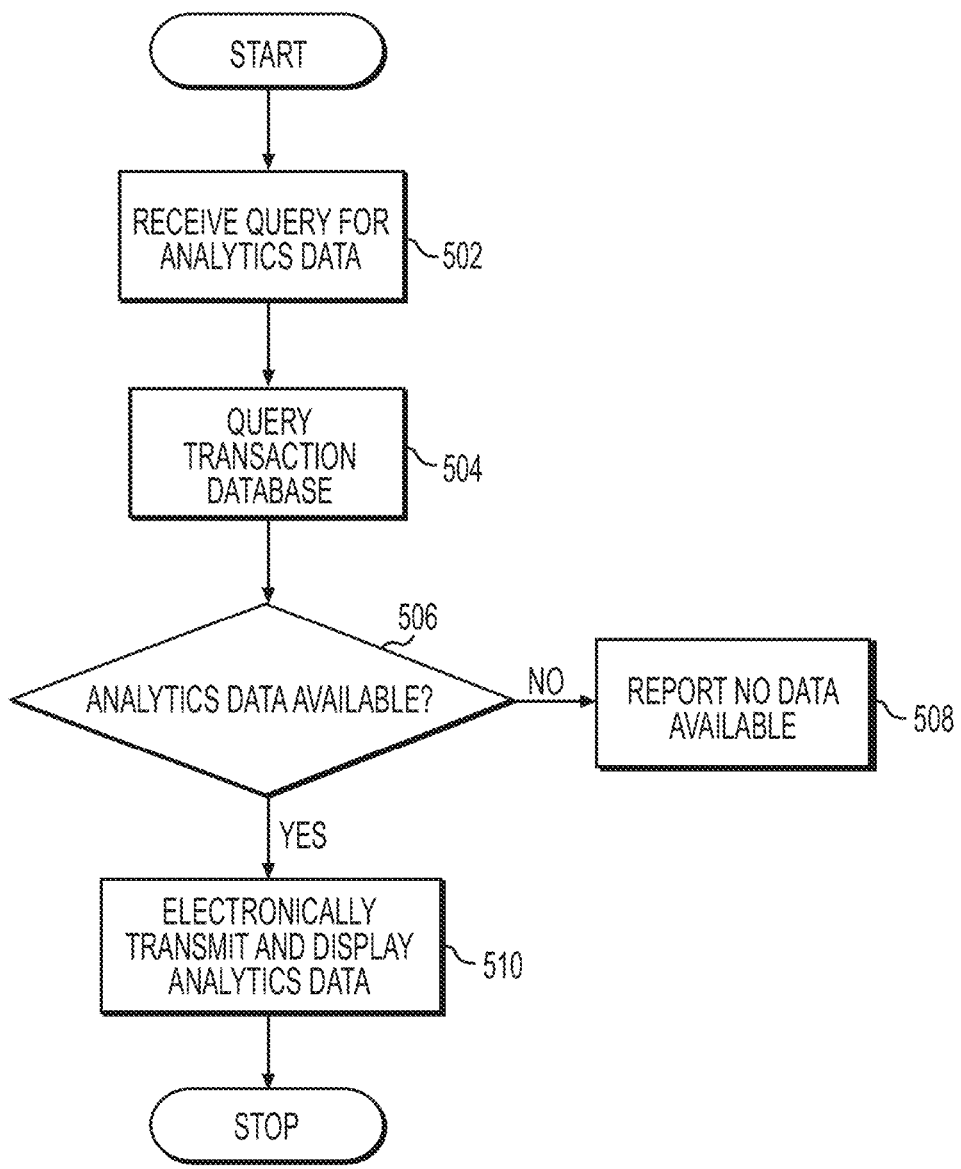
FIG. 5 depicts a flow diagram of an exemplary method for processing requests for analytical data received at an acquirer processor from payment facilitators and/or sub-merchants.

FIG. 5 depicts a flow diagram of a method for processing a request for analytics data and reports once the request is received at an acquirer processor (Step 502). Once the request for analytics data is received, the acquirer processor computing system 136 will query the acquirer processor transaction database 132 for data associated with the request (Step 504). If analytics data is available for the request (Step 506: Yes), then the analytics data is transmitted to the entity that requested the analytics data (Step 510). If no data associated with the request is available (Step 506: No), then a message is communicated to the entity that requested the analytics data, expressing that no data associated with the request is available (Step 508).

As described above with respect to the modules of acquirer processor 130, transaction data may be manipulated by various transactions, mapping, and analytics modules to generate analytics data and corresponding dashboards for display to payment facilitators and sub-merchants. For example, as shown in FIG. 6, transaction data may be manipulated by modules of acquirer processor 130 to generate analytics data comprising, for example, an exemplary dashboard 600.

In one embodiment, dashboard 600 may be generated by acquirer processor 130 for display to a payment facilitator 120. In such an embodiment, dashboard 600 may display one or more of the following metrics and analytics, including but not limited to:
Revenue Management:
Average revenue per Merchant (ARPM)
Average revenue per User/customer (ARPU)
Merchant/Customer Management:
Unique Merchant count per day/month/year over time
Unique customer count per day/month/year over time.
Repeat customer per day/month/year over time
New customers per day/month/year over time
Peak Hour Analysis:
Overall Peak hour (time of the day) in terms of transactions and revenue
Peak hour (time of the day) per merchant/sub-merchant.
Regional Analysis:
Revenue based on regions
Data Segmentation
Card types and its percentage
Card types and its percentage over time Segmentation based on Industry, Location and Merchandise (codes), etc. if captured.
News
Insights into anomalies like increases and decreases in average sales over time (based on averages per day/week/year or day of the week).
Current and Future Planned/Unplanned Outages and the customers impacted.
Revenue Generation and Forecasting Dashboards:
Sub-merchants' price quotations and average revenue projection based on the following factors:
Per transaction margin
% charge
Operating Hours (and average increase/decrease in revenues based on industry average)
Federal, state, city and other tax rates
Growth rate (revenue, customer etc.)
Competitor analysis, such as offer comparison and associated revenue margins/forecast (for example, OptBlue vs non-OptBlue) taking into account.
Existing revenue and revenue forecast,
Existing customer and forecasted customer base, and
Card, customer, and industry segmentation.
Current vs updated strategy analysis (side by side)
In one embodiment, dashboard 600 may be generated by acquirer processor 130 for display to a merchant or sub-merchant 110 (for example, at overall and store levels). In such an embodiment, dashboard 600 may display one or more of the following metrics and analytics:
Unique customer count per day/month/year over time
Repeat customer per day/month/year over time
New customers per day/month/year over time
Peak hour (time of the day) in terms of transactions, revenue
Store performance vs. industry average (merchant average and peak performance vs average & peak performance in that category).
In one embodiment, dashboard 600 may be generated by acquirer processor 130 for display internally to its own employees, agents, and contractors. In such an embodiment, dashboard 600 may display one or more of the following metrics and analytics:
Summary/Executive Reports:
Summary reports about revenue & revenue growth per product.
Top 10 customers per product and associated revenues.
Top issues and failures in the system and the impacted customers.
Pricing Models and Revenue Generation Dashboards:
Cross-payment facilitator analysis based on customers, revenue and other factors, such as pricing.
Average pricing and anomaly detection in pricing of the payment facilitators.
Pricing models and analysis (projected revenue) based on current payment facilitator customer base.
Sales & Finance
Payment facilitator/Merchant/Sub-merchant Onboarding per day/month/year
Average revenue per Payment Facilitator (ARPP)
Average revenue per Merchant (ARPM)
Average revenue per User/customer (ARPU)
Average revenue (spend) per User/customer (Overall vs. per industry vertical)
Peak and Low Revenue per day, month and year
Daily and Monthly and Yearly Peaks Rate of change (Trend or Growth) of Revenue per merchant, per Payment Facilitator, all Payment Facilitator over time
  Projection and forecast
  Histograms & Heatmaps based on number of transactions, revenue and chargebacks for:
    All industries,
    All products,
    Each product,
    Each Payment Facilitator (based on sub-merchants)
    Each Merchant
    Transaction types
    Authorized
    Chargeback
    Settlements
  Operations: Dashboards That Facilitate Investigation and Smooth Operations.
    Average & Peak transaction processing rate over time
    Anomaly detection in transaction processing, customer base or other valuable revenue determining factors.
    Average and Peak Settlement
    Completed Settlements (on a daily, weekly and quarterly basis):
    $ Amount
    # of Payment Facilitators
    # of Merchants
    # of transactions
    Failed Settlements:
    What Merchants (List)?
    What time of the day?
    What Reason code?
    What amount?
    % amount of the total settled per merchant.
    Delayed Settlements
    Average and Peak delay over time:
    Overall
    Per Payment Facilitator
    Per Merchants
    Product
    Revenue per product per day/month/year.
    Revenue growth per product per day/month/year.
    Heat map of the current product based on revenue/customer base/# of transactions etc.
    Daily/Monthly/Yearly revenues per product.
    Average/Peak/Low Transaction volume per Payment Facilitator per day/month/year.
    Revenue Projection/trend based on Past historic values.
    Shift in trends over time.

Figure 6:
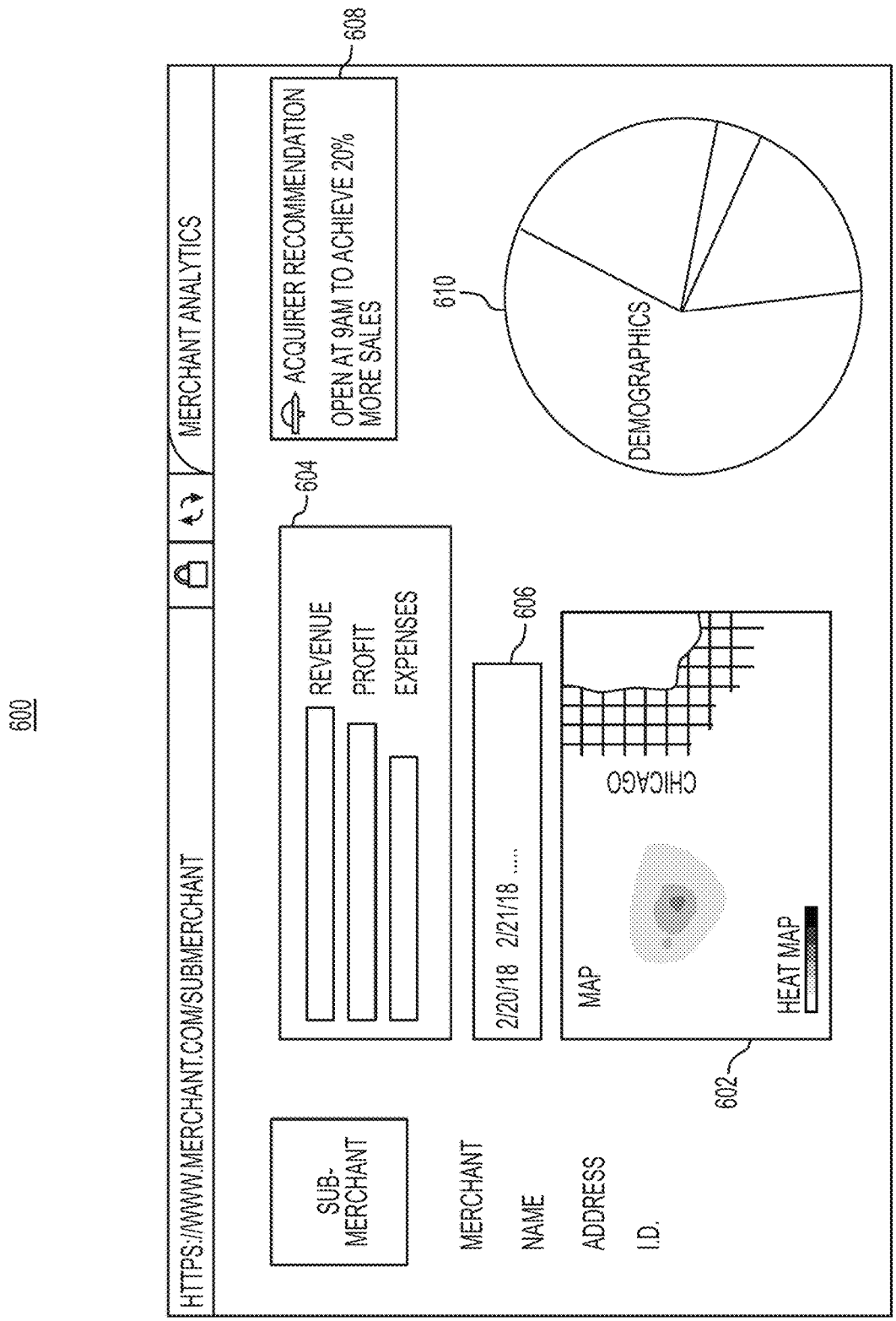
FIG. 6 depicts an example of a dashboard for providing acquirer processors, payment facilitators, and sub-merchants with analytics data describing electronic payment transactions and metrics.

As shown in FIG. 6, dashboard 600 may comprise a map 602, analytics 604, time-and-data data 606, recommendation data 608, and demographic data 610, for example. In one embodiment as shown in FIG. 6, the generated map 602 may be a map detailing the geographic locations of the payment facilitator, sub-merchant, and cardholder. Alternatively, the map 602 may be a heat map, such that it is a graphical representation of the cross-analyzation of time, geographic location, and transaction data in the form of a map or diagram in which data values are represented as colors or gradients. On a heat map, a spectrum from bright to dark colors, can be used to indicate, for example, high-to-low transaction activity, spending patterns, and fraud. Multiple heat maps can be generated to convey variation in heat over time. Here, time can be measured in any interval ranging from seconds, minutes, hours, days, months, or years.

Specifically, FIG. 6 depicts an example screenshot of an analytics report that may appear on the rideshare driver's dashboard 600, such that the dashboard 600 may convey via the map 602 (e.g. a heat map) that a majority of the ride requests are coming from, for example, the South Loop neighborhood in Chicago. Here, the map 602 may overlay bright red on top of the South Loop neighborhood in Chicago to indicate a significant number of requests for rides in that area; whereas the majority of the other neighborhoods in Chicago have a green to blue overlay to indicate less demand. The map 602 may also provide a route a driver should traverse to maximize earnings or avoid bad traffic conditions based on historical transaction data. For example, the map 602 may indicate that trips to O'Hare airport from downtown Chicago yield the highest revenue for a given time, however, the Kennedy Expressway should be avoided due to construction. The rideshare driver can track his/her earnings, expenses, tips, taxes, etc. via the dashboard 600. The rideshare driver may additionally receive a recommendation 608 on the dashboard 600 informing the driver that he/she should start driving during morning rush hour and should the driver complete at least 10 trips sometime during the day, the driver will likely attain his/her goal of earning $100.

In one embodiment, presented recommendations 608 may not be limited to business decisions a sub-merchant (e.g., rideshare driver) should make, but may also include, weather notifications, update notifications, account notifications, cardholder 170 (e.g., rider) information, achievement notifications, location trigger notifications, events that are taking place in a particular area, reminders, a social media feed, information regarding and steps the rideshare driver can take to earn: bonus income, awards, intangible objects, etc. While this embodiment conveys analytics data 606 to a rideshare driver (i.e., sub-merchant) and a ridesharing platform (i.e., payment facilitator), one having ordinary skill in the art will appreciate that other scenarios are possible (e.g., a franchise/franchise relationship, parent company/subsidiary relationship, an online/virtual marketplace vendor/sub-vendor relationship, and/or a physical marketplace vendor/sub-vendor relationship). The driver may additionally request analytics data 602 related to demographics 610 relevant to him/her.

Examples of demographics data that may be collected, may include, but are not limited to: website traffic information, payment vehicle information (e.g., cryptocurrency, fiat currency, card type, unique identifier information, etc.), geographic locations with the most requests for a product or service, cardholder 170 demographics (e.g., gender, nationality, race, age, computer/mobile manufacturer, ISP/carrier information, etc.), high/low products/services performance, product/service inventory (broken down to the unique product/service identifier and/sku level, etc.), and performance data regarding individuals or entities. It will also be apparent to one having ordinary skill in the art that the payment facilitator 120 may have similar analytics data 406 made available to it via a dashboard 600 should it submit a request for analytics data 402 to an acquirer processor 130.

Although not presented, the dashboard 600 may be dynamic and possibly segmented into regions, such that analytics data 606, 608 that appears on the dashboard may be directed and placed in certain regions of the screen by the user interface module 220. More specifically, the acquirer processor computing device 122 may be able to detect that out of the various regions on the dashboard 600 that are visible to the end user (i.e., cardholder 170, sub-merchant 110, payment facilitator 120 or acquirer processor 130), one or more regions are void of any data and has the space to display additional analytics data. For example, the acquirer processor computing system 136 may recognize that a display associated with a sub-merchant 110 is currently displaying analytics data (pertaining to revenue, demographics and location information) in 90% of the regions visible to the end user and automatically decide that the empty region should be filled with additional information, such as a notification which encourages the sub-merchant 110 to take an action which would increase profit for the payment facilitator 120 and itself. The acquirer processor computing system 136 may run visibility code such that the amount of content (i.e. analytics reports) that is being viewed is discernable. Assessing the view-ability and the lack of content in a certain region may be done by the sub-merchant POS 114 and payment facilitator computing system 136 by sending and receiving blocks of data from the acquirer processor computing system 136, comprising script, pixel (e.g., transparent pixels) information, and code for determining display or screen size, etc.

The dashboard 600 may additionally have features, such as, but not limited to various menus, taskbars, radio buttons, links, and currency conversion calculators. The dashboard may be able to respond and update data presented on the dashboard 600, based on end user interactions, such as, but not limited to: gestures on a touch screen, requests to zoom in/out, clicks via a mouse or keyboard, voice commands, body movement (e.g., blinking an eye, waving a hand, etc.), scrolling, repositioning, resizing, refreshing operations, moving a virtual reality headset, moving a device or object associated with a virtual or augmented reality environment, or a change in a computing device's geographic location. It will be appreciated by one having ordinary skill in the art, that the sub-merchant POS device 114, payment facilitator computing system 122 and acquirer processor computing system 136, will have the necessary sensors to perceive the aforementioned interactions and gestures.

Transaction module 214 of acquirer processor 130 may be configured to sort the aggregated transaction data 116 and apply weighted algorithms, such that relevant data is presented to the sub-merchant and payment facilitator on the dashboard 600. The transaction module 214 can additionally leverage machine learning algorithms to present predictive analytics to the sub-merchants 110 and payment facilitators 120, even if neither entity has requested analytics data 602-610. The transaction data 116 may be stored in a transaction database 132. As new data is created (from transactions and input from sub-merchants 110 and payment facilitators 120 on the dashboard 600) on the payment processing system 100, the transaction databases are updated in real-time. The transaction database 132 can include several separate data tables, storage devices, databases, and media for storing data pertaining to a particular aspect. The transaction database 132 is operable, through therewith, to receive instructions from the payment processing computing system 136 and obtain, update, or otherwise process data. Machine learning algorithms and business rules can use the stored transaction data 116 as inputs in the selection of analytics data that is presented to a payment facilitator 120 or sub-merchant 110 upon request 402, 404. Additionally, machine learning algorithms may use historical data in the transaction database 132 as input in the selection of analytics data that is presented on the dashboard 600.

As will be described in more detail below, transaction data may be aggregated in a database and indexed to merchants, sub-merchants, consumers, entities, and/or households using retrieved identifying information associated with the transaction, such as personally identifiable information (PII) of an individual associated with the transaction, a device fingerprint, a unique cardholder identifier, a unique payment facilitator identifier, a unique sub-merchant identifier, device-specific information, an originating IP address, which may be determined through IP proxy piercing, etc. The personally identifying information (PII) may be leveraged transaction data, such as e-mail address, mailing address, or other unique identifier (e.g., a hash or alphanumeric code). Additional data that can be collected during a transaction include geographical data, product data, service data, merchant data, sub-merchant data, conversion rates, etc. This information may then be used to train machine learning algorithms. For example, machine learning algorithms could be used to predict what data will be relevant to an acquirer processor, payment facilitator and/or a sub-merchant in generating analytics reports or making recommendations to these entities, based on aggregated data.

Although not shown, in some embodiments, various transaction data 116 may be stored on a blockchain or distributed ledger. A "blockchain" may refer to any open, shared or distributed ledger (e.g., "shared permissioned ledger,") that can record transactions between parties to a payment transaction efficiently and in a verifiable and permanent way (e.g., by providing visibility or by being transparent to various participants of the blockchain or its distributed ledger). A blockchain or its distributed ledger may be operated by many different parties that come to any shared consensus. It may maintain a growing list of ordered records, called blocks. Each block may have a timestamp and a link to a previous block. Records may be prevented from being altered retroactively. A common analogy for a blockchain or its distributed ledger may be a digital network of safety deposit boxes. These boxes can secure any digital asset (e.g., currency, securities, merchant specific points, and contracts). Each box may be locked with a crypto private key. The owner of the box can use their key to unlock the box and push a digital asset to another safety deposit box that is secured by the keys of the recipient. The recipient can then retrieve the digital asset from their safety deposit box. For example, documents may be captured and securely stored by the blockchain or its distributed ledger, for example, in an off-the-blockchain storage (e.g. NoSQL database), for retrieval by the other party. Identifiers to these documents may be stored in the blockchain or its distributed ledger. These documents may include, for example, receipts of purchases, identification information of the cardholder, sub-merchant, payment facilitator, issuer, or acquirer processor, available funds or resources, geographical information, temporal information or various other transaction data 116 described, above.

A transaction may require multifactor authentication (e.g. 2 factor authentication). Multifactor authentication typically requires is a method of confirming a user's identity by utilizing a combination of two different factors: 1) something they have, 2) something they are or 3) something they know. Therefore, in order to authorize a transaction a cardholder 170 may have to present additional information alongside their payment vehicle to sub-merchant 110 or payment facilitator 120.

Any combination of one or more non-transitory computer readable medium(s) may be utilized. The computer-readable medium may be, but is not limited to, magnetic optical, electronic, electromagnetic, infrared, apparatus device, or semiconductor system. Specific examples may include: a computer diskette, a hard disk, random access memory (RAM), read-only memory (ROM), CDROM, DVD or flash memory.

Computer program code for implementing the various processes or the present invention may be written in any of the following non-exhaustive list of programming languages: Smalltalk, Java, C++, C#. The program code may execute entirely on a computing device or across several computing devices connected via network; for example a local area network (LAN), a wide area network (WAN), or a remote computing device connected via the cloud/internet.

A computing device may be, any computer including, but not limited to, a mobile phone, a server, a tablet, a PC, a PDA. A Point of Sale (POS) may be a traditional system comprising a computer, monitory, cash drawer, receipt printer, debit/credit card reader, customer display and barcode scanner. However, the POS may be any combination of a mobile POS, terminal POS, Virtual POS, or a kiosk. POS and computing devices may be capable of two way communication with the proper components to send and receive data via NFC, Bluetooth, radio signals, GPS, infrared, etc.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A computer-implemented method for providing analytics data to one or more internet of things (IoT) device(s) by a computer system comprising:
   a processor computing system;
   a memory having processor-readable instructions stored therein; and
   a processor configured to access the memory and execute the processor-readable instructions, which when executed by the processor configures the processor to perform the computer-implemented method, the method comprising:
   receiving, by the processor computing system, payment vehicle data from a IoT device associated with a cardholder via a sub-merchant POS terminal, the payment vehicle data including transaction data and a unique identifier associated with the IoT device;
   aggregating, by the processor computing system, the transaction data;
   generating, by the processor computing system, predictive data and transaction activity map data based on the transaction data, the unique identifier, and the aggregated transaction data;
   generating and displaying, by the processor computing system, analytics reports based on the predictive data and the transaction activity map data on a screen associated with a payment facilitator or a sub-merchant;
   displaying, by the processor computing system, the analytics reports on a dashboard, the dashboard being segmented into a plurality of regions;
   determining, by the processor computing system, one or more regions without data on the dashboard; and generating and transmitting, by the processor computing system, additional analytics reports associated with the transaction data and the unique identifier to the dashboard in response to determining the one or more regions without data on the dashboard.

2. The computer-implemented method of claim 1, further comprising:
   requesting, by the processor computing system, cardholder present identifying data associated with a multifactor authentication request.

3. The computer-implemented method of claim 1, wherein the sub-merchant POS terminal is an IoT device comprising a processor, memory, and a network interface;
   wherein the sub-merchant POS terminal is one of a: mobile phone, mobile point of sale (mPOS) device, a tablet, smart home device, personal assistant device or a computer utilizing a virtual terminal; and
   wherein the sub-merchant POS terminal includes one or more of: a screen, a microphone, a camera, a speaker, or a near-field communication (NFC) reader.

4. The computer-implemented method of claim 1, wherein the IoT device associated with the cardholder further comprises a processor, memory, and a network interface; and
   wherein the IoT device associated with the cardholder comprises a mobile phone, a tablet, or a wearable device.

5. The computer-implemented method of claim 1, wherein the transaction data received at the sub-merchant POS terminal includes personally identifiable information, payment vehicle data, customer data, geographic location data, product data, service data, merchant data, and/or sub-merchant data.

6. The computer-implemented method of claim 1, determining one or more regions without data on the dashboard, further comprising:
   transmitting, by the processor computing system, data blocks comprising pixel information to the sub-merchant POS terminal or the payment facilitator.

7. A computer system for providing analytics data to internet of things (IoT) device(s), comprising:
   a processor computing system, comprising:
      a memory having processor-readable instructions stored therein; and
      a processor configured to access the memory and execute the processor-readable instructions, which when executed by the processor configures the processor to perform a plurality of functions, including functions to:
         receive, by the processor computing system, payment vehicle data from an IoT device associated with a cardholder via a sub-merchant POS terminal, the payment vehicle data including transaction data and a unique identifier associated with the IoT device;
         aggregating, by the processor computing system, the transaction data;
         generate, by the processor computing system, predictive data and transaction activity map data based on the transaction data, the unique identifier, and the aggregated transaction data;
   generate and display, by the processor computing system, analytics reports based on the predictive data and the transaction activity map data on a screen associated with a payment facilitator or a sub-merchant; and
   display, by the processor computing system, the analytics reports on a dashboard, the dashboard being segmented into a plurality of regions;
   determine, by the processor computing system, one or more regions without data on the dashboard; and
   generate and transmit, by the processor computing system, additional analytics reports associated with the transaction data and the unique identifier to the dashboard in response to determining the one or more regions without data on the dashboard.

8. The computer system of claim 7, wherein the plurality of functions further comprises:
   requesting, by the processor computing system, cardholder present identifying data associated with a multifactor authentication request.

9. The computer system of claim 7, wherein the sub-merchant POS terminal is an IoT device comprising a processor, memory, and a network interface;
   wherein the sub-merchant POS terminal is one of a: mobile phone, mobile point of sale (mPOS) device, a tablet, smart home device, personal assistant device or a computer utilizing a virtual terminal; and
   wherein the sub-merchant POS terminal includes one or more of: a screen, a microphone, a camera, a speaker, or a near-field communication (NFC) reader.

10. The computer system of claim 7, wherein the IoT device associated with the cardholder further comprises a processor, memory, and a network interface; and
    wherein the IoT device associated with a cardholder comprises a mobile phone, a tablet, or a wearable device.

11. The computer system of claim 7, wherein the transaction data received at the sub-merchant POS terminal includes personally identifiable information, payment vehicle data, customer data, geographic location data, product data, service data, merchant data, and/or sub-merchant data.

12. The computer system of claim 7, determining one or more regions without data on the dashboard further comprising:
    transmitting, by the processor computing system, data blocks comprising pixel information to the sub-merchant POS terminal or the payment facilitator computing system.

13. A non-transitory computer-readable medium storing instructions for providing analytics data to internet of things (IoT) device(s) by a computer system comprising:
    a processor computing system;
    a memory having the instructions stored therein; and
    a processor configured to access the memory and execute the instructions, which when executed by the processor configures the processor to perform the instructions, the instructions comprising:
       receiving, by the processor computing system, payment vehicle data from an IoT device associated with a cardholder via a sub-merchant POS terminal, the payment vehicle data including transaction data and a unique identifier associated with the IoT device;
       aggregating, by the processor computing system, the transaction data;
       generating, by the processor computing system, predictive data and transaction activity map data based on the transaction data, the unique identifier, and the aggregated transaction data;
       generating and displaying, by the processor computing system, analytics reports based on the predictive data and the transaction activity map data on a screen associated with a payment facilitator or a sub-merchant;

displaying, by the processor computing system, the analytics reports on a dashboard, the dashboard being segmented into a plurality of regions;

determining, by the processor computing system, one or more regions without data on the dashboard; and generating and transmitting, by the processor computing system, additional analytics reports associated with the transaction data and the unique identifier to the dashboard in response to determining the one or more regions without data on the dashboard.

14. The non-transitory computer-readable medium of claim 13, wherein the sub-merchant POS terminal is an IoT device comprising: a processor, memory, and a network interface;

wherein the sub-merchant POS terminal is one of a: mobile phone, mobile point of sale (mPOS) device, a tablet, smart home device, personal assistant device or a computer utilizing a virtual terminal; and wherein the sub-merchant POS terminal includes one or more of: a screen, a microphone, a camera, a speaker, or a near-field communication (NFC) reader.

15. The non-transitory computer-readable medium of claim 13, wherein the IoT device associated with the cardholder further comprises a processor, memory, and a network interface; and wherein the IoT device associated with the cardholder comprises a mobile phone, a tablet, or a wearable device.

16. The non-transitory computer-readable medium of claim 13, wherein the transaction data received at the sub-merchant POS terminal includes personally identifiable information, payment vehicle data, customer data, geographic location data, product data, service data, merchant data, and/or sub-merchant data.

17. The non-transitory computer-readable medium of claim 13, determining one or more regions without data on the dashboard further comprising:

transmitting, by the processor computing system, data blocks comprising pixel information to the sub-merchant POS terminal or the payment facilitator computing system.

18. The computer-implemented method of claim 1, wherein the one or more regions without data on the dashboard indicate regions that are void of any data and has space to display additional analytics data.

19. The computer-implemented method of claim 18, further comprising:

running, by the processor computing system, a visibility code to determine legibility of the additional analytics data that is displayed in the one or more regions without data on the dashboard.

20. The computer-implemented method of claim 1, wherein machine learning algorithms generate the predictive data based, at least in part, on the aggregated transaction data, and wherein the predictive data is relevant for the payment facilitator, the sub-merchant, or a combination thereof in generating the analytics reports.

\* \* \* \* \*